(12) United States Patent
Hammond et al.

(10) Patent No.: US 6,313,600 B1
(45) Date of Patent: Nov. 6, 2001

(54) CONTROL METHOD AND APPARATUS FOR INSUFFICIENT INPUT VOLTAGE IN AN AC DRIVE

(75) Inventors: Peter W. Hammond, Greensburg; Richard Osman, Pittsburgh, both of PA (US)

(73) Assignee: Robicon Corporation, New Kensington, PA (US)

( * ) Notice: Subject to any disclaimer, the term of this patent is extended or adjusted under 35 U.S.C. 154(b) by 0 days.

(21) Appl. No.: 09/515,442

(22) Filed: Feb. 29, 2000

(51) Int. Cl.$^7$ .................................................. H02P 5/28
(52) U.S. Cl. ...................... 318/798; 318/803; 318/800; 318/812; 318/811; 318/801
(58) Field of Search ................................ 318/798, 803, 318/800, 812, 811, 801

(56) References Cited

U.S. PATENT DOCUMENTS

| | | | |
|---|---|---|---|
| 3,593,103 | * 7/1971 | Chandler et al. | 318/803 |
| 5,057,760 | * 10/1991 | Dadpey et al. | 318/807 |
| 5,099,186 | * 3/1992 | Rippel et al. | 318/803 |
| 5,345,154 | * 9/1994 | King | 318/803 |

* cited by examiner

Primary Examiner—Karen Masih
(74) Attorney, Agent, or Firm—Buchanan Ingersoll, P.C.

(57) ABSTRACT

An electric drive apparatus and method for controlling AC motors wherein the motor output is a function of the AC input power to the electric drive. Means are provided for detecting the voltage being supplied by the source of AC power to a drive circuit, and for controlling the output to the multi-phase AC load based on the detected power level. A controller monitors the motor voltage, current, and speed or frequency while also receiving a command for torque or torque-producing current. The method provides for the operation of the drive circuit in the event of either a partial or complete loss of AC input power. During such an occurrence, the controller will cause the circuit to generate sufficient negative torque to cause a power flow from the motor to the drive circuit to substantially equal the inherent losses in the drive and motor to avoid loss of energy from the DC filter of the drive circuit. Motor torque and speed can be quickly restored when the input power is re-established.

14 Claims, 4 Drawing Sheets

CONTROL METHOD AND APPARATUS FOR INSUFFICIENT INPUT VOLTAGE IN AN AC DRIVE

BACKGROUND OF THE INVENTION

1. Field of the Invention

This invention relates to variable-speed alternating current (AC) motor drives and a method for operating a variable-speed AC motor drive, and particularly to controlling such a drive during a collapse of the input source voltage.

2. Description of the Prior Art

Many existing variable speed AC motor drives operate from an AC source (such as a utility) that is shared by other equipment. Such a source may experience a brief collapse of voltage occasionally, due to operation of its other loads, or to switching operations by the utility. It is very desirable that the variable speed AC motor drive should continue operating during such a disturbance, but it is economically impractical to store enough energy within the drive to supply the load power throughout the disturbance. Furthermore, the control circuits within the drive may depend on the same stored energy to sustain their operation during the disturbance. If that energy is depleted beyond a certain point, the drive may shut itself down or trip. Many processes can tolerate a temporary loss of speed during a disturbance far better than they can tolerate a drive shutdown. Therefore, a need exists for a drive control method which, upon detecting a collapse of input source voltage, can quickly stop the flow of power, allowing the speed to decrease, but preserving the stored energy for the control circuits. The object of such a control is that the drive should not shutdown during a brief collapse of supply voltage, so that normal operation can quickly resume at the conclusion of the disturbance.

Most drives use capacitors in the DC link to store energy, and to provide smoothing. In the event that the input source voltage is greatly diminished or lost, the capacitors would rapidly become discharged if continued operation of the motor under load is attempted. Thus, it is desirable that the loss of energy from the capacitors be quickly curtailed as soon as a collapse of input source voltage is detected.

Several schemes are known in the prior art which detect a loss of the input source voltage into the drive circuit, and which act to modify the operation of the circuit and thus of the AC induction motor. One such scheme is found in U.S. Pat. No. 4,673,858 which issued on Jun. 16, 1987 to Saito. In this system, upon detection of a collapse of the input AC source voltage, the torque-producing component of output current to the AC motor is forced substantially to zero such that generally no power is supplied to the load. Therefore little power is drawn from the capacitors, except for maintaining the motor magnetizing current and for supplying the losses inherent in the motor and in the drive circuits. The AC induction motor is allowed to continue rotating in a "free run" condition, so that its speed tends to decrease by natural deceleration.

During the collapse of input source voltage, it is desired to maintain the charge on the capacitors as near to the normal level as possible, both to sustain the control circuit power and so that the drive circuit can resume normal operation quickly upon recovery of the input source voltage. Therefore, it is desired to minimize the loss of charge within the capacitors while the AC induction motor continues to rotate due to inertia after such loss of input source voltage. It is also desirable to provide a drive regulator circuit, which minimizes energy flow from the capacitors when the input source voltage is below a minimum acceptable range.

As described, the prior control method proposed by Saito stops the flow of power out of the motor by clamping the torque command substantially to zero. However, this method still allows the inherent losses in the drive and in the motor to gradually deplete the energy stored in the drive capacitors during the disturbance.

It is therefore an object of this invention to avoid depleting the energy stored in the drive capacitors by using kinetic energy extracted from the load to supply substantially all of the inherent losses, and hence to prolong the ability of the drive to tolerate a collapse of supply voltage.

It is also an object of this invention to effect such control without requiring feedback of the DC voltage on the drive capacitors, since in some topologies DC voltage feedback is not easily available.

SUMMARY OF THE INVENTION

The invention provides for a drive for use with a three-phase AC motor, and a method for operating such a drive. In an electric drive including means for converting power from an AC power source to a DC voltage, means for storing DC energy, means for converting said DC energy to an AC input source having adjustable voltage and frequency to operate the AC motor and a drive controller, a control method comprises the following steps: Detecting a voltage level of the AC power source and comparing the detected voltage level with a first predetermined minimum AC voltage level. The AC motor speed is also monitored. A normal torque command signal is provided to the drive controller and a total power loss in the electric drive and the AC motor is estimated. A negative torque value is calculated as a function of the total power loss and the motor speed. A modified torque command signal is provided to the controller by transitioning from the normal torque command signal to the negative torque value when the detected AC voltage level approaches the first predetermined minimum AC voltage level.

Other details, objects and advantages of the invention will become apparent as the following description of certain present preferred embodiments proceeds.

DESCRIPTION OF PREFERRED EMBODIMENTS

Figure 1:
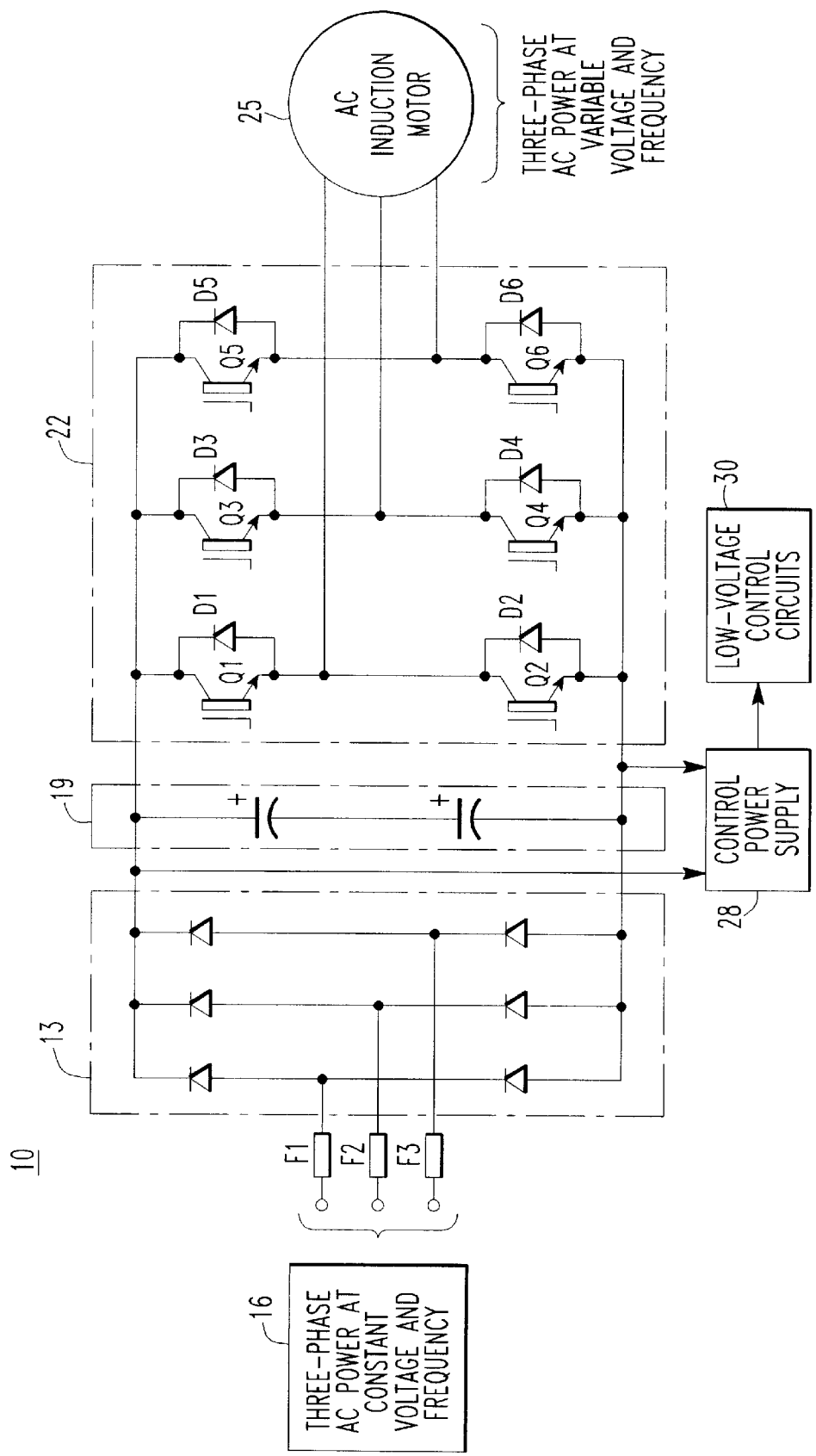
FIG. 1 shows a typical power circuit for a low-voltage variable speed AC motor drive.

FIG. 1 shows a typical power circuit 10 for a variable-frequency AC drive, such as might be employed with this invention. The drive power circuit 10 consists of a rectifier 13 receiving power from an AC source 16 and delivering direct current (DC) to a smoothing filter 19. The smoothed DC is delivered to an inverter 22, which converts the power back to AC at an adjustable frequency and voltage, for variable-speed operation of an AC motor 25. A control power supply means 28 conditions power from the smoothed DC to operate the controller 30. With proper control, the stored energy in the DC smoothing filter 19 is sufficient to allow the control power to be sustained during a brief collapse of the input source voltage 16, but it is not sufficient to maintain the flow of power to the motor and its load.

Figure 2:
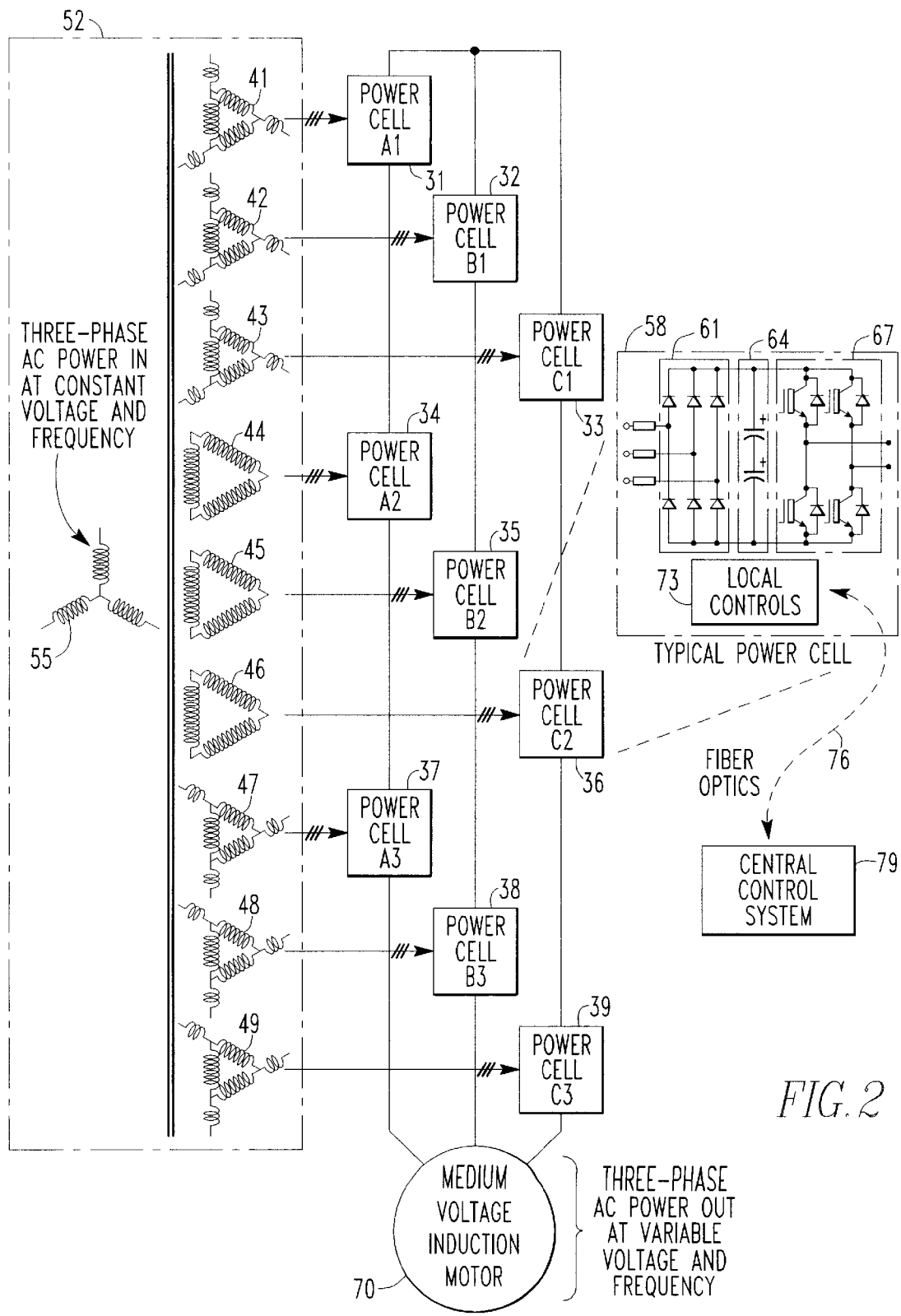
FIG. 2 shows a typical power circuit for a medium-voltage variable speed AC motor drive.

Many other drive power circuit topologies share the characteristic that their stored energy is sufficient to maintain the control power but not the load power during a brief collapse of the input power source. It will be apparent to those skilled in the art that these other topologies can also be employed with this invention. One example is shown in FIG. 2 from U.S. Pat. No. 5,625,545 to which patent is incorporated by reference herein. While the invention will be described as it can be used on a specific drive topology, as described and shown in the above-referenced U.S. Pat. No. 5,625,545, it will be understood that the apparatus and method of this invention can be utilized in any AC drive configuration, including for example the circuit of FIG. 1. As shown in FIG. 2 the power circuits including the stored energy capacitors are distributed among many separate power cells 31–39. Each power cell receives input from a separate secondary winding 41–49 on a transformer 52. It may be desirable to lower the transformer's K-factor and to reduce harmonics in the source currents. This can be accomplished by shifting the phase-angle of the secondary winding circuits either by zig-zag, or extended delta windings, as shown. The transformer 52 in turn receives power on its primary winding 55 from a source of input voltage such as a utility.

A typical power cell 58 has a local rectifier 61 receiving power from one of the secondary windings 41–49. The DC output of the rectifier is smoothed by local filter capacitors 64 and delivered to a local inverter 67, which converts the power back to AC at an adjustable frequency and voltage.

The power cells are arranged in groups for each phase output line to the motor (70), and the cell outputs within each group are connected in series. The ends of the groups opposite from the motor 70 are connected in a star configuration.

Each power cell also has a local control system 73 that preferably receives commands over fiber optics 76 from a central control system 79. The local control 73 receives its control power from the DC voltage across the capacitors 64 within that cell. With proper control, the energy stored in the capacitors 64 of each cell is sufficient to sustain the local control system 73 during a brief collapse of the input power source. However, in this case the central control system 79 must have other provisions to maintain its control power. Note that in the circuit of FIG. 2 it is not generally practical to obtain feedback of the DC voltage on the capacitors 64, because they are distributed among the many separate power cells 31–39.

Figure 3:
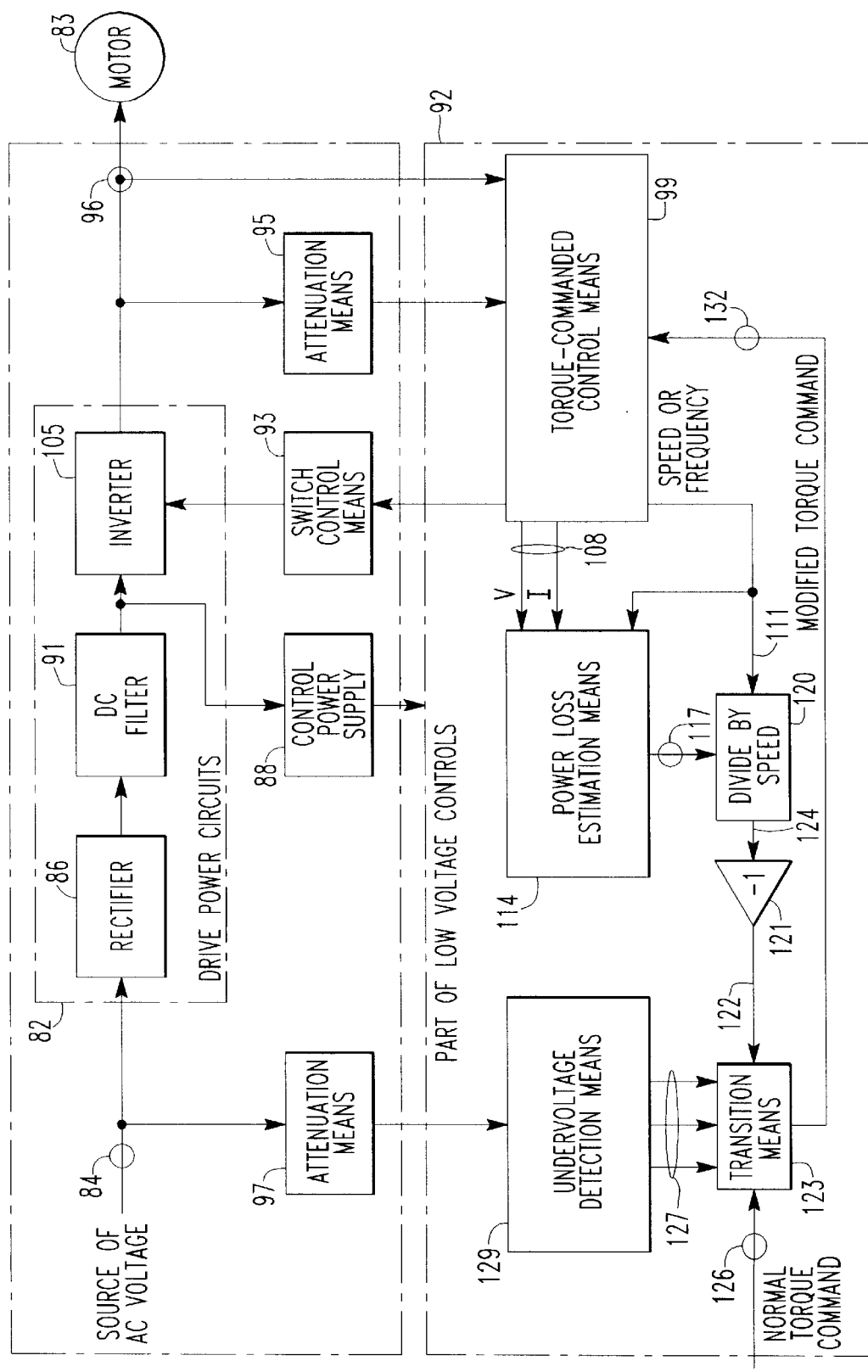
FIG. 3 shows a generalized embodiment of the control method according to the present invention.

FIG. 3 shows a generalized embodiment of the control method of the present invention. The power circuit 82 for operating AC motor 83 is shown as similar to FIG. 1, but could also be similar to FIG. 2 or some other topology. The drive power circuit 82 consists of a rectifier 86 receiving power from an AC source 84 and delivering DC to a smoothing DC filter 91. The smoothed DC current is delivered to an inverter 105, which converts the power back to AC at an adjustable frequency, for variable-speed operation of a load, such as an AC motor 83.

A control power supply 88 may condition DC power from a DC filter 91 to operate the control circuits 92. Feedback elements 95, 96 and 97 monitor the motor voltage, the motor current, and the source voltage. These feedback means sense, attenuate and isolate these high-voltage signals; passing low-voltage replicas to the low-voltage controls, which may be implemented in either hardware or software. Part of these low-voltage controls are shown in the control circuit 92 as will be more fully described hereinafter.

The control system includes a torque-commanded control means 99 which receives a modified command 132 for torque (or for torque-producing current), and which uses the feedback signals for motor voltage and current to generate suitable command signals for the switching devices in the inverter 105 so as to produce the desired torque. The switching command signals are amplified and isolated by the switch control means 93 before they are applied to the switching devices. By suitable processing the torque-commanded control means 99 can also generate signals 108 for motor voltage and current, as well as AC motor speed or frequency 111.

One requirement in order to practice this invention is that the drive control system should contain a torque-commanded control means 99. Such control systems are becoming very popular; an example is discussed in "Implementation of a Direct Stator Flux Orientation Control on a Versatile DSP System" by Xu and Novotny from the 1990 IEEE/IAS Conference Record, pp. 404–409. In the following description, it is to be understood that a positive torque is one that has the same polarity as the motor speed, so that power flows from the drive into the motor. A negative torque is one that has the opposite polarity as the motor speed, so that power flows from the motor into the drive.

As shown in FIG. 3, the torque commanded control means 99 provides signals 108 to the power loss estimation means 114. This provides an estimated total power loss for the control circuit which is either a predetermined fixed number or can be calculated as a function of one or more of the AC motor voltage, AC motor current, AC motor frequency and/or AC motor speed. The power loss estimation means 114 provides an output 117 to a calculation means 120. The calculation means 120 divides the output 117 from the power loss estimation means 114 by the AC motor speed or frequency 111. The output from 120 is signal 124, which represents the amount of torque corresponding to the estimated losses. If necessary, it is given a negative value by inverting amplifier 121 and is provided as negative torque limit 122 to transition means 123 which also receives other inputs: the normal torque command 126 and the outputs 127 from undervoltage detection means 129. The normal torque command 126 is selected by the transition means 123 to become the modified torque command 132 when the source of AC voltage is above a first predetermined minimum level, such as ninety percent (90%) of the nominal voltage level for the AC power source 84. This generally allows normal control of torque and power to the motor 83. In the event that the source of AC voltage 84 falls below this first predetermined minimum, but is above a second predetermined minimum such as seventy percent (70%) of the nominal voltage level, the transition means 123 begins to blend in the negative torque limit 122, and to fade out the normal torque command 126, for use as the modified torque command 132. By the time the AC source voltage 84 has fallen to the second predetermined level, the modified torque command 132 consists entirely of the negative torque limit 122.

In this manner, in the event of a partial or complete loss of the AC voltage input 84, the torque commanded control means 99 will cause the circuit to generate sufficient negative torque to cause a power flow from the motor 83 to the drive power circuit 82 to substantially equal the inherent losses in the drive and motor, as provided by the power loss estimation means 114, thus avoiding loss of energy from the DC filter 91 of the drive circuit. Motor torque and speed can be quickly restored when the input power is re-established. As was stated previously the inherent losses can either be a constant fixed number, or can be calculated as a function of the AC motor parameters.

Figure 4:
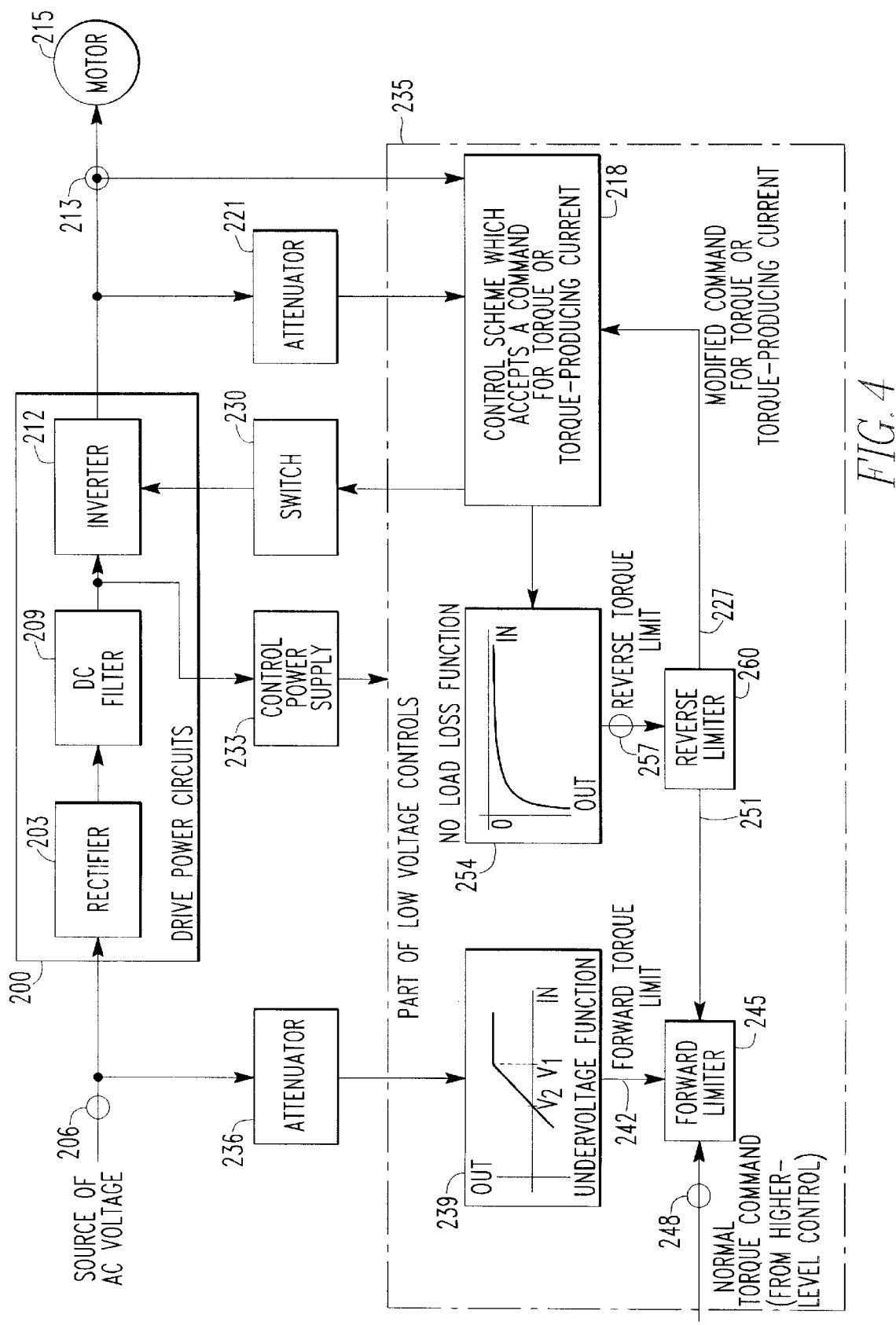
FIG. 4 shows a specific embodiment of the control method according to the present invention.

In referring now to FIG. 4 in detail, there is shown a specific embodiment of the control method of this invention. The embodiment in FIG. 4 is just one specific way to implement the general method of FIG. 3. A power circuit 200 for operating AC motor 215 is shown as similar to FIG. 1, but could also be similar to FIG. 2 or some other topology. A drive power circuit 200 consists of a rectifier 203 receiving power from an AC source 206 and delivering DC to a smoothing DC filter 209. The smoothed DC current is delivered to an inverter 212, which converts the power back to AC at an adjustable frequency, for variable-speed operation of a load, such as an AC motor 215. A control power supply 233 may condition DC power from the DC filter 209 to operate the control circuits 235. Feedback elements 221, 213 and 236 monitor the motor voltage, the motor current, and the source voltage.

A controller 218 is provided which monitors the motor voltage and current by attenuator means 221 and current sensors 213. The controller 218 receives a command 227 for torque (or for torque-producing current), and generates command signals for the switching devices in the inverter 212 so as to produce the desired torque. The switching commands are amplified and isolated by the switch drivers 230. By suitable processing the controller 218 can also generate a speed signal 233.

While the drive power circuit can have many configurations, including that shown in U.S. Pat. No. 5,625,545, the present invention is most useful with a drive power circuit that is only able to process power in a forward direction. In other words it cannot absorb power from the load and return it to the AC source 206. As previously stated, it is also preferred that the drive controller receive a command 227 for torque or torque-producing current. One object of this invention is to control the AC drive in such a way that it can continue to operate during short periods while the AC source voltage 206 collapses either partially or completely.

In FIG. 4 the input voltage from AC power source 206 is monitored through a second attenuation 236, so that an under-voltage function 239 can generate a voltage-dependent positive forward torque limit signal 242. This forward torque limit signal may have a fixed value as long as the input AC voltage is above a first setpoint V1. If the input AC voltage drops below the setpoint V1, the torque-limit signal may decrease proportional to the input AC voltage with a slope such that it reaches zero at a second setpoint V2. If the input AC voltage continues to decrease below the setpoint V2, the forward torque limit signal becomes negative by following the same slope as between V1 and V2 extended below V2, thereby producing a negative value for the forward torque limit signal 242. In FIG. 4, V2 is shown smaller than V1 to give a gradual change in the forward torque limit 242 as the input AC voltage 206 decreases, but V2 could also be equal to V1 to give an abrupt change in the forward torque limit 242. In the preferred embodiment, V1 is equal to about 90% of the normal input voltage, and V2 is equal to about 70%.

A forward limiter function 245 receives the forward torque limit signal 242, and also a normal torque command signal 248 from higher-level control functions (not shown), and produces an output signal 251 which is the smallest (least positive or most negative) of the forward torque limit or the normal torque command. The normal torque command 248 is provided when the AC voltage source 206 is at or above V1, which can be equal to 90% of the normal input voltage.

For a bi-directional drive, means would need to be included to modify the polarities of the torque signals whenever the speed reverses, but such means are well known to those skilled in the art, and thus omitted from FIG. 4 for clarity.

A no-load loss function 254 generates a reverse torque limit signal 257 which represents the amount of negative torque which will cause power to flow from the motor 215 into the drive circuit 200 to be substantially equal to the no-load losses of the drive and motor together. These no-load losses can be a fixed number calculated according to the overall circuit design. Generally the dominant losses are due to the motor magnetizing current flowing through the drive semiconductors and through the motor windings; and these losses tend to be constant as speed is varied if motor flux is constant. Since the product of speed and torque must equal these losses, the reverse torque limit 257 will vary inversely with speed 233 as shown in FIG. 4. In a typical drive circuit according to the present invention, if the no-load losses are 1% of rating, then at 100% speed the reverse torque limit will be at –1%. However, at 50% speed the reverse torque limit will be at –2%, at 25% speed the reverse torque limit will be at –4%, and at 10% speed the reverse torque limit will be at –10%. For all these values, the power flowing out of the motor will be 1% of rated.

A reverse limiter function 260 receives the output 251 from the forward limit function 245, and also the reverse torque limit 257 from the no-load loss function 254, and produces the modified torque command 227 which is the largest (most positive or least negative) of these signals.

Because the reverse torque limit 257 is applied after the forward torque limit 242, it will over-ride the forward limit 242 if it is more negative than the reverse limit 257. This can be the case during a collapse of the input AC voltage from AC power source 206, if the voltage falls below the setpoint V2. The under-voltage function 239 will then generate a large negative forward torque limit signal 242, which will be the value selected by the forward limiter 245 and will appear on its output signal 251. This output signal 251 will generally be more negative than the reverse torque limit 257 from the no-load loss function 254, so that the reverse limiter 260 will select the reverse torque limit 257 to appear on its output as the modified torque command 227. Thus during the duration of the collapse of input AC voltage 206, the drive will generate just enough negative torque to cause power flow from the motor 215 into the drive 200 to substantially equal the losses in the drive and motor. This will avoid a loss of energy from the DC filter 209, so that the drive can continue to operate briefly. Although the motor speed will diminish during the collapse, because the motor flux is maintained it will be possible to restore torque (and ultimately speed) without delay when the collapse is over.

Note that the forward limiter 245 and the reverse limiter 260 together perform the function of the transition means 123 in FIG. 3. The no-load loss function 254 performs the functions of the power loss estimation means 114, the calculation means 120, and the inverting amplifier 121 in FIG. 3.

When used with the drive circuit in U.S. Pat. No. 5,625,545 for example, in the event of complete power loss, in order to prevent the smoothing capacitors in the DC filter 209 from discharging too quickly, the induction motor can be caused to operate in a regenerating mode. In this mode of operation, the losses inherent in the motor and the inverter are supplied by the power generated from the inertial rotation of the load. The present invention is designed to operate such that no power is supplied from the capacitors. Even the power for the control circuits is drawn from the inertial rotation of the load.

In the present invention, in order to continue to provide all the losses through the continued operation of the motor upon a complete loss of input power, the motor is caused to decelerate at a rate slightly greater than the natural deceleration since the motor is operating in a regenerative mode. This substantially prevents a loss of energy from the capacitor, since the lost energy is provided by regeneration. Thus, discharge of the capacitor is reduced as much as possible. By way of example, in a typical motor which has a rating of 100 kilowatts, the no-load losses inherent in the motor and inverter are generally in the range of 1 kilowatts. The energy stored in the DC filter capacitors of a drive of this size is generally in the range of 1500 Watt-seconds. Only half of this energy can be consumed before the capacitor voltage is reduced to 70%. Thus without regeneration according to this invention, the voltage would decline to 70% in less than one second. The operation of the motor in a regenerative mode according to the present invention maintains the charge within the capacitors for as long as possible so as to provide for optimal operation of the system during this loss of power period, as well as upon reinstatement of the input line voltage.

While specific embodiments of, and methods for practicing, the invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the invention which is to be given the full breadth of the following claims and any and all embodiments thereof.

What is claimed is:

1. A method of controlling an electric drive for use with an AC motor, said electric drive including means for converting power from an AC power source to a DC voltage, means for storing DC energy, means for converting said DC energy to an AC input source having adjustable voltage and frequency to operate the AC motor, a drive controller, and means for responding to a command for torque or torque-producing current, said control method comprising the steps of:
    detecting a voltage level of said AC power source and comparing said detected voltage level with first and second predetermined AC voltage levels;
    monitoring the AC motor speed;
    providing a normal torque command signal to the drive controller;
    estimating a total power loss in the electric drive and the AC motor;
    calculating a negative torque command value as a function of said total power loss and said AC motor speed; and
    providing a modified torque command signal by transitioning from said normal torque command signal toward the negative torque command signal when said detected AC voltage level falls below the first predetermined minimum AC voltage level and approaches a second predetermined AC voltage level.

2. The method as recited in claim 1, wherein the step of providing the modified torque command signal further comprises selecting the normal torque command to be the modified torque command if the detected AC voltage level is greater than the first predetermined minimum AC voltage level, selecting the negative torque limit to be the modified torque command if the detected AC voltage level is less than the second predetermined minimum AC voltage level, and controlling the modified torque command to have a value between the normal torque command and the negative torque limit if the detected AC voltage level is between the first and second predetermined minimum AC voltage levels.

3. The method as recited in claim 2, wherein the first predetermined minimum voltage level is 90% of a nominal voltage level for the AC power source.

4. The method as recited in claim 3, wherein the second predetermined minimum voltage level is 70% of the nominal voltage level.

5. The method as recited in claim 1, wherein said estimated total power loss is a fixed number.

6. The method as recited in claim 5, further comprising the step of calculating a negative torque limit by dividing said estimated total power loss by one of the AC motor speed or frequency.

7. The method as recited in claim 6, wherein the step of providing the modified torque command signal further comprises selecting the normal torque command to be the modified torque command if the detected AC voltage level is greater than the first predetermined minimum AC voltage level, selecting the negative torque limit to be the modified torque command if the detected AC voltage level is less than the second predetermined minimum AC voltage level, and controlling the modified torque command to have a value between the normal torque command and the negative torque limit if the detected AC voltage level is between the first and second predetermined minimum AC voltage levels.

8. The method as recited in claim 7, wherein a forward torque limit signal is generated to have its normal value if the detected AC voltage level is greater than the first predetermined AC voltage level, and to diminish linearly if the detected AC voltage level is below the second predetermined AC voltage level, at such a rate that the forward torque limit passes zero as the detected AC voltage level passes the second preselected AC voltage level.

9. The method as recited in claim 8, wherein the step of providing the modified command signal comprises comparing said normal torque command signal with said forward torque limit and said negative torque limit, wherein said modified command signal is chosen as the least positive of said normal command signal or said forward torque limit, but not more negative than said negative torque limit.

10. The method as recited in claim 1, wherein the step of estimating the total power loss comprises calculating the total power loss as a function of one or more of AC motor voltage, AC motor current, AC motor frequency and AC motor speed.

11. The method as recited in claim 10, further comprising the step of calculating a reverse command limit by dividing said estimated total power loss by the AC motor speed.

12. The method as recited in claim 11, wherein the step of providing the modified torque command signal further comprises selecting the normal torque command to be the modified torque command if the detected AC voltage level is greater than the first predetermined minimum AC voltage level, selecting the negative torque limit to be the modified torque command if the detected AC voltage level is less than the second predetermined minimum AC voltage level, and controlling the modified torque command to have a value between the normal torque command and the negative torque limit if the detected AC voltage level is between the first and second predetermined minimum AC voltage levels.

13. The method as recited in claim 12, wherein a forward torque limit signal is generated to have its normal value if the detected AC voltage level is greater than the first predetermined AC voltage level, and to diminish linearly if the detected AC voltage level is below the second predetermined AC voltage level, at such a rate that the forward torque limit passes zero as the detected AC voltage level passes the second preselected AC voltage level.

14. The method as recited in claim 13, wherein the steps of providing the modified command signal comprises comparing said normal torque command signal with said forward torque limit and said negative torque limit, wherein said modified command signal is chosen as the least positive of said normal command signal or said forward torque limit, but not more negative than said negative torque limit.

* * * * *

UNITED STATES PATENT AND TRADEMARK OFFICE
CERTIFICATE OF CORRECTION

PATENT NO.     : 6,313,600 B1
DATED          : November 6, 2001
INVENTOR(S)    : Peter W. Hammond and Richard Osman It is certified that error appears in the above-identified patent and that said Letters Patent is hereby corrected as shown below:

<u>Title page,</u>
Item [56], References Cited, U.S. PATENT DOCUMENTS, please add the following prior art:
-- 5,625,545    4/1997      Hammond
   4,673,858    6/1987      Saito
   4,417,193    11/1983     Hirata
   3,781,614    12/1973     Mokrytzki et al. --
Item [56], OTHER PUBLICATIONS,
-- Zdenek, Electrodynamical Phenomenon in a System Voltage Inveter-Induction Machine by the Loss of D.C. Supply Voltage, ACTA Technica CSAV, p. 431-447, 1980 --

Signed and Sealed this

Twenty-seventh Day of August, 2002

Attest:

JAMES E. ROGAN
Attesting Officer     Director of the United States Patent and Trademark Office